US010135303B2

(12) United States Patent
Moyer et al.

(10) Patent No.: US 10,135,303 B2
(45) Date of Patent: Nov. 20, 2018

(54) OPERATING A WIRELESS POWER TRANSFER SYSTEM AT MULTIPLE FREQUENCIES

(71) Applicant: Apple Inc., Cupertino, CA (US)

(72) Inventors: Todd K. Moyer, Cupertino, CA (US); Jeffrey J. Terlizzi, Cupertino, CA (US); Jeffrey M. Alves, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 764 days.

(21) Appl. No.: 14/281,812

(22) Filed: May 19, 2014

(65) Prior Publication Data
US 2015/0333530 A1 Nov. 19, 2015

(51) Int. Cl.
H02J 50/12 (2016.01)
H02J 50/40 (2016.01)
H02J 5/00 (2016.01)
H02J 7/02 (2016.01)
H02J 50/80 (2016.01)

(52) U.S. Cl.
CPC ............... H02J 50/40 (2016.02); H02J 5/00 (2013.01); H02J 5/005 (2013.01); H02J 7/02 (2013.01); H02J 7/025 (2013.01); H02J 50/12 (2016.02); H02J 50/80 (2016.02)

(58) Field of Classification Search
CPC ................................ H02J 17/00; H02J 5/005; H02J 50/00–50/90; H01F 2038/143; H01F 38/14; H04B 5/0037; H04B 5/0087
See application file for complete search history.

(56) References Cited

U.S. PATENT DOCUMENTS 3,502,809 A 3/1970 Dickey
4,785,136 A 11/1988 Mollet
4,871,220 A 10/1989 Kohin
(Continued)

FOREIGN PATENT DOCUMENTS

EP 2211438 7/2010
EP 2256895 12/2010
(Continued)

OTHER PUBLICATIONS

U.S. Appl. No. 15/422,345, filed Feb. 1, 2017, Qiu et al.
(Continued)

*Primary Examiner* — Fritz M Fleming
(74) *Attorney, Agent, or Firm* — Brownstein Hyatt Farber Schreck, LLP

(57) ABSTRACT

A transmitter device in an inductive energy transfer system includes a first transmitter coil operatively connected to a first resonant circuitry. A receiver device includes a first receiver coil operatively connected to a first resonant circuitry. The first transmitter coil and the first receiver coil form a first transformer. The transmitter device, the receiver device, or both the transmitter and receiver devices can also include an auxiliary coil or inductor, which may form an auxiliary transformer. Energy can be transferred from the transmitter device to the receiver device using the first transformer or the auxiliary transformer. The transfer of energy may be adaptively adjusted based on the efficiency of the energy transfer. For example, the transfer of energy can be adjusted based on the operating conditions of the load.

19 Claims, 6 Drawing Sheets

(56) References Cited

U.S. PATENT DOCUMENTS

| | | |
|---|---|---|
| 5,373,102 A | 12/1994 | Ehrlich et al. |
| 5,384,575 A | 1/1995 | Wu |
| 5,496,966 A | 3/1996 | Hightower et al. |
| 5,545,844 A | 8/1996 | Plummer, III |
| 5,563,614 A | 10/1996 | Alden |
| 5,760,584 A | 6/1998 | Frederick |
| 6,144,512 A | 11/2000 | Eden |
| 6,269,247 B1 | 7/2001 | Chiodini |
| 6,449,181 B1 | 9/2002 | Rieger et al. |
| 6,492,587 B1 | 12/2002 | Yoshinaga |
| 6,724,950 B2 | 4/2004 | Byrne |
| 6,768,051 B2 | 7/2004 | Wiltshire |
| 6,864,419 B2 | 3/2005 | Lovens |
| 6,927,574 B2 | 8/2005 | Young |
| 7,035,087 B2 | 4/2006 | Tan |
| 7,068,140 B2 | 6/2006 | Chou |
| 7,170,363 B2 | 1/2007 | Wiltshire |
| 7,466,077 B2 | 12/2008 | Joo et al. |
| 7,639,206 B2 | 12/2009 | Behdad |
| 7,679,205 B1 | 3/2010 | Burns |
| 7,705,591 B2 | 4/2010 | Geren et al. |
| 7,732,038 B2 | 6/2010 | Naito et al. |
| 7,737,370 B2 | 6/2010 | Aoyama et al. |
| 7,791,311 B2 | 9/2010 | Sagoo |
| 7,906,936 B2 | 3/2011 | Azancot et al. |
| 7,948,208 B2 | 5/2011 | Partovi et al. |
| 7,948,781 B2 | 5/2011 | Esaka et al. |
| 7,952,322 B2 | 5/2011 | Partovi et al. |
| 8,050,063 B2 | 11/2011 | Wagoner et al. |
| 8,101,931 B2 | 1/2012 | Blandford, III |
| 8,115,448 B2 | 2/2012 | John |
| 8,169,185 B2 | 5/2012 | Partovi et al. |
| 8,193,769 B2 | 6/2012 | Azancot et al. |
| 8,262,244 B2 | 9/2012 | Metcalf |
| 8,421,274 B2 | 4/2013 | Sun et al. |
| 8,436,317 B1 | 5/2013 | Chen |
| 8,587,154 B2 | 11/2013 | Fells et al. |
| 8,629,652 B2 | 1/2014 | Partovi et al. |
| 8,629,654 B2 | 1/2014 | Partovi et al. |
| 8,723,053 B2 | 5/2014 | Winch |
| 8,729,734 B2 | 5/2014 | Widmer et al. |
| 8,760,113 B2 | 6/2014 | Keating et al. |
| 8,810,196 B2 | 8/2014 | Ettes et al. |
| 8,836,276 B2 | 9/2014 | Prescott |
| 8,838,022 B2 | 9/2014 | Dobyns |
| 8,890,470 B2 | 11/2014 | Partovi |
| 8,896,264 B2 | 11/2014 | Partovi |
| 8,901,881 B2 | 12/2014 | Partovi |
| 8,928,284 B2 | 1/2015 | Carobolante |
| 8,947,047 B2 | 2/2015 | Partovi et al. |
| 8,947,892 B1 | 2/2015 | Lam |
| 9,024,576 B2 | 5/2015 | Maenpaa |
| 9,025,143 B2 | 5/2015 | Hahn |
| 9,071,062 B2 | 6/2015 | Whitehead |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,118,203 B2 | 8/2015 | Davis |
| 9,124,126 B2 | 9/2015 | Ichikawa |
| 9,153,998 B2 | 10/2015 | Mayo |
| 9,171,555 B2 | 10/2015 | Meloche |
| 9,178,369 B2 | 11/2015 | Partovi |
| 9,209,627 B2 | 12/2015 | Baarman et al. |
| 9,217,323 B2 | 12/2015 | Clark |
| 9,276,437 B2 | 3/2016 | Partovi et al. |
| 9,281,759 B2 | 3/2016 | Lee et al. |
| 9,300,147 B2 | 3/2016 | Lee et al. |
| 9,356,659 B2 | 5/2016 | Partovi |
| 9,497,894 B1 | 11/2016 | Ramsey |
| 9,548,158 B2 | 1/2017 | Groves et al. |
| 9,711,272 B2 | 7/2017 | Hassan-Ali et al. |
| 9,726,518 B2 | 8/2017 | Widmer et al. |
| 9,917,479 B2 | 3/2018 | Bronson et al. |
| 10,044,232 B2 | 8/2018 | Crosby et al. |
| 2002/0137473 A1 | 9/2002 | Jenkins |
| 2004/0021376 A1 | 2/2004 | Beulich |
| 2008/0067914 A1 | 3/2008 | Kim et al. |
| 2008/0298100 A1* | 12/2008 | Esaka .................. H02J 50/10 363/67 |
| 2009/0052721 A1 | 2/2009 | Dabrowski |
| 2009/0127937 A1* | 5/2009 | Widmer ................ H02J 50/12 307/149 |
| 2009/0230777 A1* | 9/2009 | Baarman ............... H01F 38/14 307/104 |
| 2010/0007307 A1* | 1/2010 | Baarman ............... H02J 7/025 320/108 |
| 2010/0015918 A1 | 1/2010 | Liu et al. |
| 2011/0050164 A1 | 3/2011 | Partovi et al. |
| 2011/0169770 A1 | 7/2011 | Mishina et al. |
| 2011/0221385 A1 | 9/2011 | Partovi et al. |
| 2012/0104997 A1 | 5/2012 | Carobolante |
| 2012/0139358 A1* | 6/2012 | Teggatz ................ H01F 38/14 307/104 |
| 2012/0198364 A1 | 8/2012 | Bornheimer et al. |
| 2013/0043734 A1 | 2/2013 | Stone et al. |
| 2013/0093388 A1 | 4/2013 | Partovi |
| 2013/0099563 A1 | 4/2013 | Partovi et al. |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2014/0035383 A1* | 2/2014 | Riehl .................... H01F 38/14 307/104 |
| 2014/0103873 A1 | 4/2014 | Partovi et al. |
| 2014/0132210 A1 | 5/2014 | Partovi |
| 2014/0191568 A1 | 7/2014 | Partovi |
| 2014/0306654 A1 | 10/2014 | Partovi |
| 2014/0354279 A1 | 12/2014 | Dumoulin |
| 2015/0043424 A1 | 2/2015 | Mitchell |
| 2015/0115878 A1* | 4/2015 | Park .................... H02J 17/00 320/108 |
| 2015/0130412 A1 | 5/2015 | Partovi |
| 2015/0288193 A1 | 10/2015 | Crosby et al. |
| 2015/0303707 A1 | 10/2015 | McCauley et al. |
| 2015/0318710 A1* | 11/2015 | Lee .................... H02J 50/80 307/104 |
| 2015/0333562 A1 | 11/2015 | Nam et al. |
| 2016/0036261 A1 | 2/2016 | Lenive |
| 2016/0064137 A1 | 3/2016 | Perez et al. |
| 2016/0172894 A1 | 6/2016 | Khripkov et al. |
| 2016/0181853 A1 | 6/2016 | Yang et al. |
| 2016/0196943 A1 | 7/2016 | Jarrahi et al. |
| 2016/0284465 A1 | 9/2016 | Maniktala |
| 2016/0336804 A1 | 11/2016 | Son et al. |
| 2016/0372948 A1 | 12/2016 | Kvols |
| 2017/0092409 A1 | 3/2017 | Graham |
| 2017/0093199 A1 | 3/2017 | Pinciuc et al. |
| 2018/0062442 A1 | 3/2018 | Qiu et al. |

FOREIGN PATENT DOCUMENTS

| | | |
|---|---|---|
| JP | 5510608 | 6/2014 |
| KR | 20080081480 | 9/2008 |
| WO | WO 08/032746 | 3/2008 |
| WO | WO 09/081126 | 7/2009 |

OTHER PUBLICATIONS

U.S. Appl. No. 15/474,569, filed Mar. 30, 2017, Jain et al.
U.S. Appl. No. 14/245,817, filed Apr. 4, 2014, Crosby et al.
U.S. Appl. No. 14/290,411, filed May 29, 2014, Bossetti.

* cited by examiner

OPERATING A WIRELESS POWER TRANSFER SYSTEM AT MULTIPLE FREQUENCIES

TECHNICAL FIELD

The invention relates generally to wireless power transfer systems, and more particular to operating a wireless power transfer system at more than one band of frequencies.

BACKGROUND

Many electronic devices include one or more rechargeable batteries that require external power to recharge from time to time. Often, these devices may be charged using a similar power cord or connector, for example a universal serial bus ("USB") connector. However, despite having common connection types, devices often require separate power supplies with different power outputs. These multiple power supplies can be burdensome to use, store, and transport from place to place. As a result, the benefits of device portability may be substantially limited.

Furthermore, charging cords may be unsafe to use in certain circumstances. For example, a driver of a vehicle may become distracted attempting to plug an electronic device into a vehicle charger. In another example, a charging cord may present a tripping hazard if left unattended.

To account for these and other shortcomings of portable electronic devices, some devices include an inductive charging device. The user may simply place the electronic device on an inductive charging surface of a charging device in order to transfer energy from the charging device to the electronic device. The charging device transfers energy to the electronic device through inductively coupling between a transmitter coil in the charging device and a receiver coil in the electronic device. But as the size of many electronic devices continues to decrease, the transmitter coil may have an inductance that is lower than desired. This lower inductance can lead to large circulating currents in the inductive charging device in the transmitter device, which can result in large power losses. In situations where a high amount of power is needed by the receiver device, the large power losses may be acceptable. But when only a small amount of power is needed on the receiver side, the losses in the transmitter coil may be unacceptable and can cause thermal problems or unacceptably large parasitic standby power, also known as vampire power.

SUMMARY

Embodiments described herein provide inductive energy transfer systems that operate at more than one band of frequencies, using an appropriate band for a desired level of delivered energy. In one aspect, a receiver device for use in an inductive energy transfer system can include a first receiver coil operatively connected to an input of an AC-to-DC converter and a first resonant circuitry operatively connected between the first receiver coil and the input of the AC-to-DC converter. An auxiliary receiver coil may be operatively connected to the input of the AC-to-DC converter. An auxiliary resonant circuitry can be operatively connected between the second receiver coil and the input of the AC-to-DC converter. The first resonant circuitry is associated with a first resonant frequency, and the second resonant circuitry is associated with a second resonant frequency that is different from the first resonant frequency.

In one embodiment, the second resonant frequency is higher than the first resonant frequency.

In another aspect, a transmitter device for use in an inductive energy transfer system can include a DC-to-AC converter operatively connected to a first resonant circuitry and an auxiliary resonant circuitry. A first transmitter coil may be operatively connected to the first resonant circuitry. An auxiliary transmitter coil can be operatively connected to the auxiliary resonant circuitry. The first resonant circuitry is associated with a first resonant frequency, and the auxiliary resonant circuitry is associated with a second resonant frequency different from the first resonant frequency. As described earlier, the second resonant frequency is higher than the first resonant frequency in some embodiments.

The first transmitter and the first receiver coils form a first transformer. The auxiliary transmitter coil and the auxiliary receiver coil form an auxiliary transmitter. The auxiliary transformer can be used to transfer lesser amounts of energy at higher frequencies and the first transformer may be used to transfer greater amounts of energy at lower frequencies.

In some embodiments, an inductive energy transfer system can include an auxiliary transmitter coil but not an auxiliary receiver coil. An auxiliary transmitter coil can couple inductively with a first receiver coil to transfer energy. The auxiliary transmitter coil and the first receiver coil form an auxiliary transformer.

In other embodiments, an inductive energy transfer system can include an auxiliary receiver coil but not an auxiliary transmitter coil. An auxiliary receiver coil can couple inductively with a first transmitter coil to transfer energy. The auxiliary receiver coil and the first transmitter coil form an auxiliary transformer.

In another aspect, a method for operating an inductive energy transfer system can include transferring energy from a transmitter device to a receiver device using a first transformer in a power transfer mode, and transferring energy from the transmitter device to the receiver device using an auxiliary transformer in a low energy transfer mode.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Figure 1:
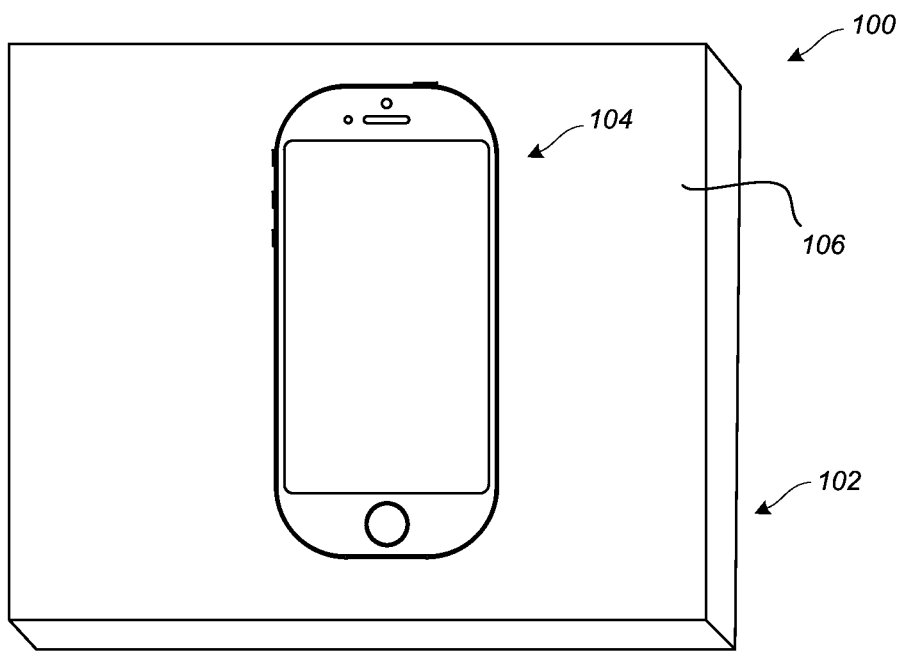
FIG. 1 illustrates one example of inductive energy transfer system.

Embodiments described herein provide inductive energy transfer systems that operate at more than one band of frequencies, using an appropriate band for a desired level of delivered energy. Energy can be transferred inductively from a transmitter device to a receiver device to charge a battery or to operate the receiver device. Additionally or alternatively, communication or control signals can be transmitted inductively between the transmitter and receiver devices. For example, while charging, high frequency pulses can be added on top of the inductive charging frequency to enable both charging and communication. Alternatively, the transferred energy can be used solely for communication. Thus, the terms "energy", "signal", or "signals" are meant to encompass transferring energy for wireless charging, transferring energy as communication and/or control signals, or both wireless charging and the transmission of communication and/or control signals.

A transmitter device in an inductive energy transfer system includes a first transmitter coil operatively connected to a first resonant circuitry. A receiver device includes a first receiver coil operatively connected to a first resonant circuitry. The first transmitter coil and the first receiver coil form a first transformer. The transmitter device, the receiver device, or both the transmitter and receiver devices can also include an auxiliary coil or inductor, which may form an auxiliary transformer. Energy can be transferred from the transmitter device to the receiver device using the first transformer or the auxiliary transformer. The transfer of energy may be adaptively adjusted based on the efficiency of the energy transfer. For example, the transfer of energy can be adjusted based on the operating conditions of the load.

In some embodiments, the transmitter device can transfer a short burst of energy to the receiver device to determine if the first receiver coil is coupled to the first transmitter coil. This short burst of energy is known as a ping. The transmitter device may transmit a ping and wait for a response from the receiver device. If no response is received, the transmitter device waits for a given period of time before sending another ping. If a response is received, the transmitter device can transfer energy to the receiver device to charge a battery and/or to transmit one or more communication signals to the receiver device. In one embodiment, the transmitter device can ping the receiver device using an auxiliary transformer. The auxiliary transformer can be energized with a signal having a higher frequency to ping the receiver device with a lower amount of energy. If the receiver device transmits a response, the transmitter device can energize the first transmitter coil with a signal having a lower frequency to transfer a higher amount of energy to the receiver device. Additionally or alternatively, energy can be transferred using the auxiliary transformer for other purposes. For example, the auxiliary transformer can be used to transfer power for trickle charging and the first transformer may transfer energy for power charging.

In some embodiments, an AC-to-DC converter in the receiver device can be implemented as a bridge rectifier. Other embodiments can construct the AC-to-DC converter as a synchronous rectifier. In a synchronous rectifier, the diodes in a bridge rectifier may be replaced with transistors, such as power metal oxide semiconductor field-effect transistors (MOSFETs). A processing device can turn each respective MOSFET on or off. Typically, a power MOSFET includes a body diode between the drain and the source of the MOSFET. It may be more efficient in some embodiments to turn off the synchronous rectifier and use the body diodes as a bridge rectifier when the load is lighter; namely, when the load is drawing less current.

Referring now to FIG. 1, there is shown a top view of one example of an inductive energy transfer system. The inductive energy transfer system 100 includes a charging device 102 and an electronic device 104. In the illustrated embodiment, the charging device 102 is depicted as a charging dock and the electronic device as a smart telephone. The electronic device and/or the charging device can be implemented as different devices in other embodiments. For example, the electronic device 104 can be a digital media player, a wearable electronic or communication device, a health monitoring device, a tablet computing device, and any other type of electronic device that includes one or more inductive charging coils. As another example, the charging device 102 may be adapted to be inserted into a charging port in an electronic device.

The electronic device 104 is placed on a charging surface 106 of the charging device 102 when charge is to be transferred to the electronic device. The charging device 102 may be connected to a power source through a power cord (e.g., a wall outlet) or through a connector such as a Universal Serial Bus (USB) connector (not shown). The charging device 102 includes one or more inductive charging coils that transfer energy to one or more inductive charging coils in the electronic device 104. In this manner, the charging device 102 is a transmitter device with a transmitter coil or coils and the electronic device 104 is a receiver device with one or more receiver coils. Energy can be transferred, for example, to charge a battery in the electronic device 104 or to operate the electronic device. Additionally or alternatively, control and/or communication signals can be transferred wirelessly between the charging device 102 and the electronic device 104.

Figure 2:
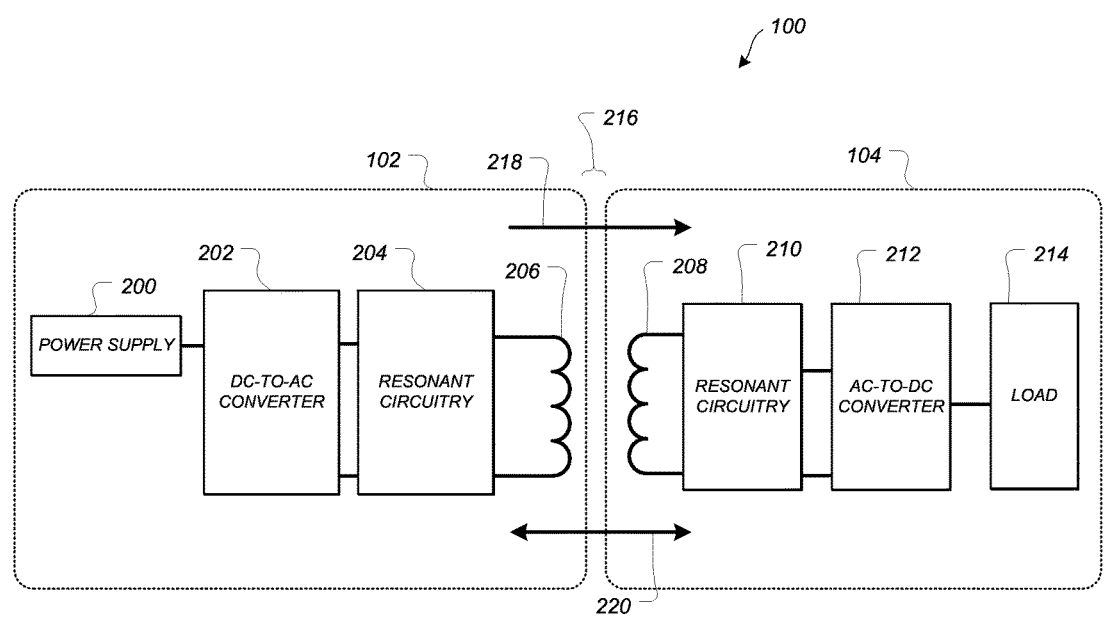
FIG. 2 depicts a simplified block diagram of one example of the inductive energy transfer system 100 shown in FIG. 1.

FIG. 2 depicts a simplified block diagram of one example of the inductive energy transfer system 100 shown in FIG. 1. The transmitter device 102 includes a power supply 200 operably connected to a DC-to-AC converter 202. Any suitable type of a DC-to-AC converter may be used. For example, the DC-to-AC converter can be constructed as an H bridge in one embodiment. The DC-to-AC converter 202 is operatively connected to transmitter resonant circuitry 204. The transmitter resonant circuitry 204 is operatively connected to a first transmitter coil 206.

The receiver device 104 can include a first receiver coil 208 operably connected to receiver resonant circuitry 210. The receiver resonant circuitry 210 is operatively connected to an AC-to-DC converter 212. Any suitable type of AC-to-DC converter may be used. For example, the AC-to-DC converter can be constructed as a diode bridge in one embodiment.

A load 214 is operably connected to the output of the AC-to-DC converter 212. The load 214 is a rechargeable battery in one embodiment. A different type of load can be used in other embodiments.

The first transmitter coil 206 and the first receiver coil 208 together form a first transformer 216. The first transformer 216 transfers power or energy through inductive coupling between the first transmitter coil 206 and the first receiver coil 208 (energy transfer represented by arrow 218). Essentially, energy is transferred from the first transmitter coil 206 to the first receiver coil 208 through the creation of a varying magnetic flux by the AC signal in the first transmitter coil 206 that induces a current in the first receiver coil 208. The AC signal induced in the first receiver coil 208 is received by the AC-to-DC converter 212 that converts the AC signal into a DC signal. In embodiments where the load 214 is a rechargeable battery, the DC signal is used to charge the battery. Additionally or alternatively, the transferred energy can be used to transmit communication signals to or from the receiver device (communication signals represented by arrow 220).

In some embodiments, the leakage inductance of a transformer can be significant. Thus, the transmitter and receiver resonant circuitry 204 and 210 may be included in the inductive energy transfer system 100 to cancel some or all of the leakage inductance when the capacitance and inductance values are near the resonant frequency (frequency $f_{R1}$). Any suitable type of resonant circuitry can be used. In some embodiments, the transmitter resonant circuitry 204 is a resonant capacitor connected in series between the DC-to-AC converter 202 and the first transmitter coil 206. The receiver resonant circuitry 210 is a resonant capacitor connected in series between the first receiver coil 208 and the AC-to-DC converter 212.

Generally, the operating conditions of a load may vary over time, which can adversely impact transfer efficiency. For example, when the load is a rechargeable battery, the battery draws a higher current when charging and less current when charged or nearly charged (e.g., trickle charging). Therefore, it can be desirable to vary the transfer of energy based on the operating conditions of the load, which results in a more efficient transfer of energy. For example, the frequency and/or the amount of energy being transferred can be adjusted when the operating conditions of the load change.

Figure 3:
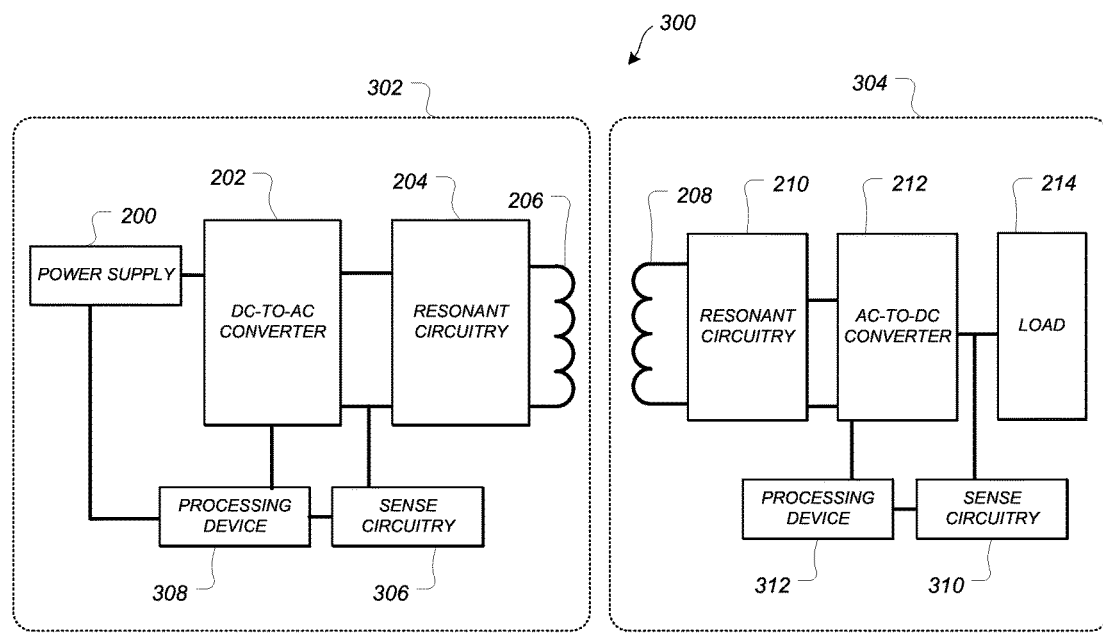
FIG. 3 illustrates a simplified block diagram of an example of a first inductive energy transfer system transfers energy more efficiently.

FIG. 3 illustrates a simplified block diagram of an example of a first inductive energy transfer system that transfers energy more efficiently. The inductive energy transfer system 300 is similar to the embodiment shown in FIG. 2, with the addition of a sense circuit and a processing device in the receiver device 304 and in the transmitter device 302. The load and/or the efficiency of energy transfer can be monitored continuous, periodically, or at select times and adjustments made accordingly to improve efficiency. This way the efficiency curve may be optimized over a wider range of load currents or conditions in real time or near real time.

The transmitter device 302 can include a sense circuit 306 operatively connected to the transmitter coil 206 and a processing device 308 operatively connected to the sense circuit. The processing device 308 may also be operatively connected to the power supply 200 and/or to the DC-to-AC converter 202. The sense circuit 306 can monitor or measure the current in the first transmitter coil 206. The processing device 308 may analyze the measurements to determine whether the receiver device 304 has transmitted a communication signal to the transmitter device 302. For example, the receiver device 304 can request the transmitter device to transfer more or less energy. The processing device 308 can adaptively adjust one or more settings in the transmitter device based on received communication and/or control signals from the receiver device. For example, the processing device 308 may adjust the signal level and/or frequency of the signal that is received by the first transmitter coil.

The receiver device 304 can include a sense circuit 310 operatively connected to the load 214 and a processing device 312 connected to the sense circuit 310. The processing device 312 may also be connected to the DC-to-AC converter 212. The sense circuit 310 can sense or measure the state or operations of the load, such as the current input into the load. The processing device 312 may analyze the measurements to determine whether an operating condition of the load has changed and if so, transmit a communication signal to the transmitter device 302. For example, the receiver device 304 can request the transmitter device to transfer more or less energy. Additionally or alternatively, the receiver device 304 can transmit a signal indicating the battery is charged, and in response the transmitter device may enter a low power or sleep state.

The processing devices 308, 312 can each be implemented as any electronic device capable of processing, receiving, or transmitting data or instructions. For example, the processing device 308 can be a microprocessor, a central processing unit (CPU), an application-specific integrated circuit (ASIC), a digital signal processor (DSP), or combinations of multiple such devices. As described herein, the term "processing device" is meant to encompass a single processor or processing unit, multiple processors, multiple processing units, or other suitably configured computing element or elements.

Figure 4:
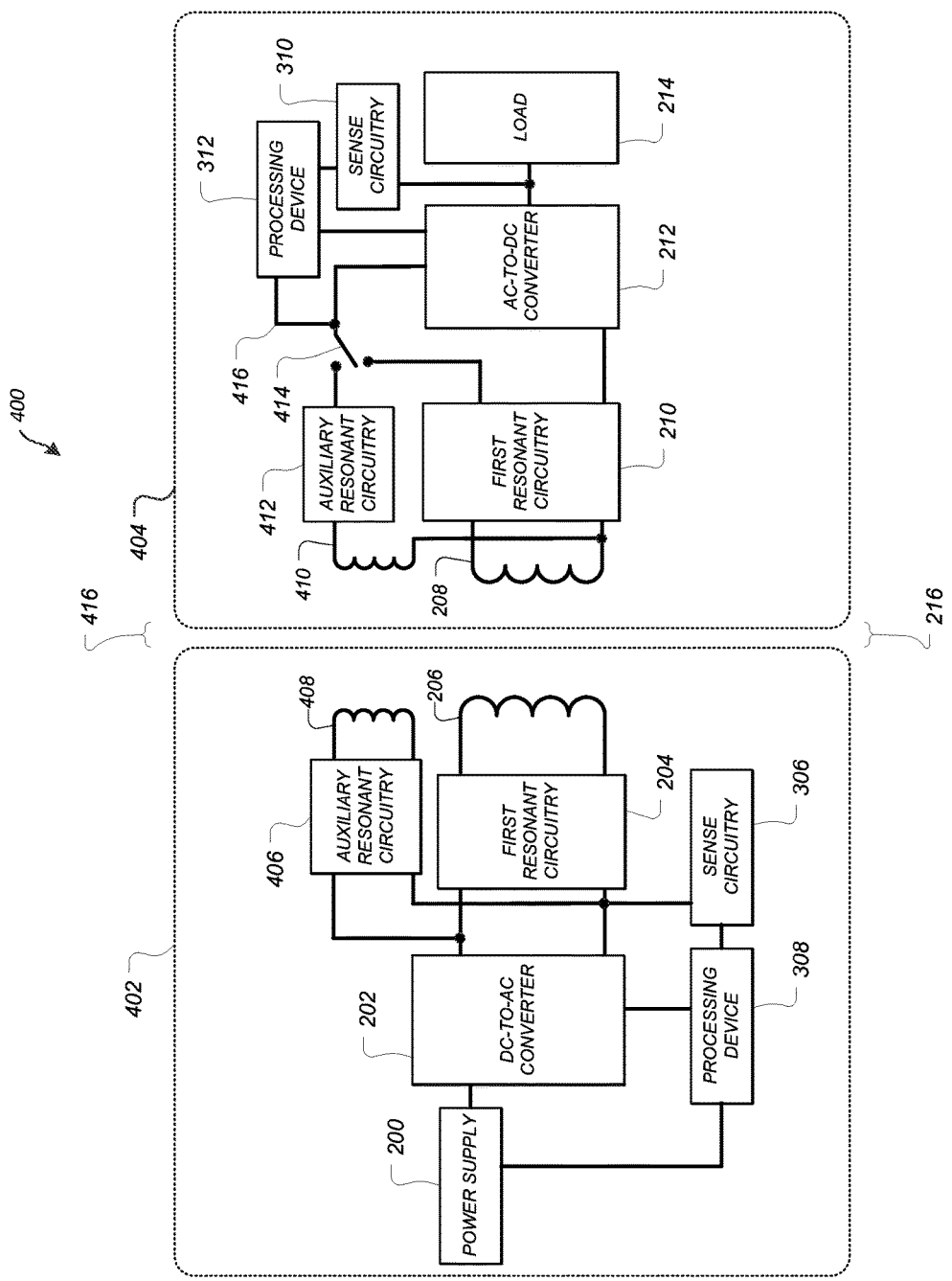
FIG. 4 depicts a simplified block diagram of an example of a second inductive energy transfer system that transfer energy more efficiently.

Referring now to FIG. 4, there is shown a simplified block diagram of an example of a second inductive energy transfer system that transfers energy more efficiently. The inductive energy transfer system 400 is similar to the embodiment shown in FIG. 3, with the addition of an auxiliary transmitter and/or auxiliary receiver coil and corresponding auxiliary resonant circuitry. The auxiliary transmitter coil and/or auxiliary receiver coil can transfer energy at a frequency (frequency $f_{R2}$) that is different from the frequency $f_{R1}$ of the first transformer 216. In some embodiments, the auxiliary coil(s) and corresponding resonant circuitry are optimized to be efficient at higher frequencies ($f_{R1}<f_{R2}$). The auxiliary coil(s) can be used to transfer lesser amounts of energy at higher frequencies (e.g., when the load is lighter), while the first transmitter and receiver coils may be used to transfer greater amounts of energy at lower frequencies.

In some embodiments, the transmitter device 402 can include auxiliary resonant circuitry 406 operatively connected between the output of the DC-to-AC converter 202 and an auxiliary transmitter coil 408. And the receiver device 404 may include an auxiliary receiver coil 410 operatively connected to auxiliary resonant circuitry 412. The first resonant circuitry 210 or the auxiliary resonant circuitry 412 is operatively connected to the AC-to-DC converter 212 through a switching device 414. Any suitable type of switching device can be used and may include one or more switching devices. The processing device 312 is operatively connected to the switching device 414 through the signal line 416 to control the state of the switching device (i.e., to connect auxiliary resonant circuitry or to connect first resonant circuitry to AC-to-DC converter 212).

The auxiliary transmitter coil 408 and the auxiliary receiver coil 410 together form an auxiliary transformer 416. As described earlier, in one embodiment the first transformer 216 is used to transfer a greater amount of energy at lower frequencies and the auxiliary transformer 416 transfers a lesser amount of energy at higher frequencies. As one example, the auxiliary transmitter coil 408 may be constructed as a small coil of a relatively thin wire having a high number of turns. When energized at a higher frequency, the impedance of the inductor is higher so a lower amount of current flows through the coil and a higher output voltage is produced. However, less energy may be transferred to the auxiliary receiver coil 410 due to a higher output resistance. At higher frequencies, the lower amount of energy can transfer more efficiently than with the first transformer 216 when the load is lighter. As described earlier, a load is "lighter" when the load is drawing less current.

Other inductive energy transfer systems can include the auxiliary transmitter coil but not the auxiliary receiver coil. For example, an auxiliary transmitter coil can couple inductively with a first receiver coil to transfer energy at a frequency that is different from first resonant frequency $f_{R1}$. The auxiliary transmitter coil and the first receiver coil form an auxiliary transformer. Alternatively, an inductive energy transfer system may include an auxiliary receiver coil but not an auxiliary transmitter coil. The first transmitter coil can couple inductively with an auxiliary receiver coil to transfer energy at a frequency that is different from first resonant frequency $f_{R1}$). The auxiliary receiver coil and the first transmitter coil form an auxiliary transformer. As described earlier, the auxiliary transformer may be used to ping the receiver device periodically or at select times in some embodiments.

As one example, the first transformer 216 can transfer energy at 250-400 kHz while the auxiliary transformer may transfer energy at 750 kHz-1 MHz. In some embodiments, the auxiliary transmitter coil 408 can be used to ping the receiver device periodically and the first transmitter coil 206 can be used to charge a battery in the receiver device. As described earlier, the sense circuit 310 and the processing device 312 in the receiver device 404 can be used to determine when to transfer energy with the auxiliary transformer 416 based on the load conditions. The receiver device 404 can transmit a communication signal to the transmitter device 402 informing the transmitter device of the operating condition of the load and/or to transfer energy using the auxiliary transformer 416. The sense circuit 306 and the processing device 308 in the transmitter device 402 receives the communication signal and the processing device 308 can adjust the operation of the DC-to-AC converter 202 so that a higher frequency signal is received by the auxiliary transmitter 402.

Thus, the inductive energy transfer system 400 can have different operating modes. A first mode can transfer a higher amount of energy at lower frequencies using the first transformer 216. A second mode can transfer a lower amount of energy at higher frequencies using the auxiliary transformer 416. The second mode allows the transmitter device 402 to ping the receiver device 404 periodically without consuming a lot of power. For example, when the transmitter device 402 is in a low power or sleep state, the transmitter device 402 may wake up periodically to transmit a ping to detect the presence of the receiver device, to determine if the receiver device needs more power, and/or to see if the receiver device has a status update.

Figure 5:
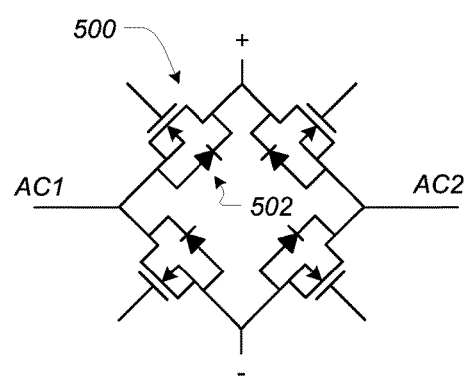
FIG. 5 illustrates an example power metal oxide semiconductor field-effect transistor (MOSFET) bridge.

As described previously, any suitable type of AC-to-DC converter can be used in a receiver device. In some embodiments, the AC-to-DC converter 212 in the receiver device 404 can be implemented as a diode bridge. Other embodiments can construct the AC-to-DC converter 212 as a synchronous rectifier. In a synchronous rectifier, the diodes in the diode bridge may be replaced with transistors, such as power metal oxide semiconductor field-effect transistors (MOSFETs). FIG. 5 illustrates an example MOSFET bridge. A MOSFET bridge can function as an AC-to-DC converter, such as AC-to-DC converter 212 in the receiver device. The processing device 312 may turn each respective MOSFET on or off. Typically, a power MOSFET 500 includes a body diode 502 between the drain and the source of the MOSFET (see FIG. 5). With a lighter load, it may be more efficient to turn off the synchronous rectifier and use the body diodes 502 as a diode bridge.

Figure 6:
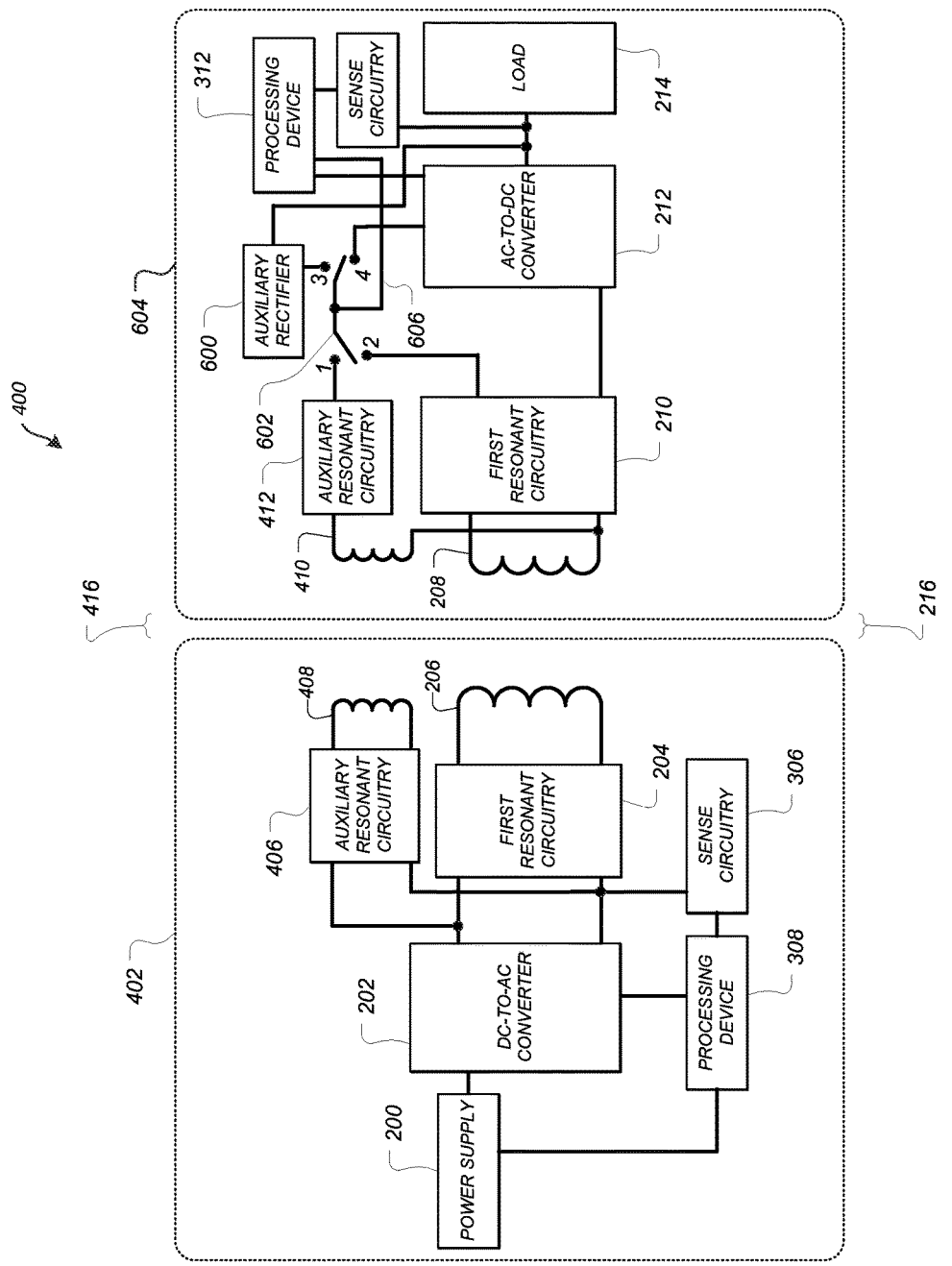
FIG. 6 depicts a simplified block diagram of an example of a third inductive energy transfer system that transfer energy more efficiently.

Alternatively, a separate auxiliary AC-to-DC converter or rectifier 600 in the receiver device 604 can be connected to the auxiliary receiver coil 410 (see FIG. 6). The processing device 312 is connected to a switching device 602 through signal line 606 to control the state of the switching device 602. When contacts 2 and 4 of the switching device 602 are electrically connected together, the load 214 may be connected to the primary receiver coil 208 through the AC-to-DC converter 212 and the resonant circuitry 210. Alternatively, the load 214 may be connected to the primary receiver coil 208 through the auxiliary rectifier 500 and the resonant circuitry 210 when contacts 2 and 3 are electrically connected together. Then again, the load 214 can be connected to the auxiliary receiver coil 410 through the AC-to-DC converter 212 and the auxiliary resonant circuitry 412 when contacts 1 and 4 are electrically connected together. Conversely, the load 214 may be connected to the auxiliary receiver coil 410 through the auxiliary rectifier 600 and the auxiliary resonant circuitry 412 when contacts 1 and 3 are electrically connected together. Thus, energy can be transferred to the load using one of several paths in the receiver device 604, with the selection of the path being based on the operating conditions of the load. The selected path can change in real time or near real time as the operating conditions of the load vary over time.

Figure 7:
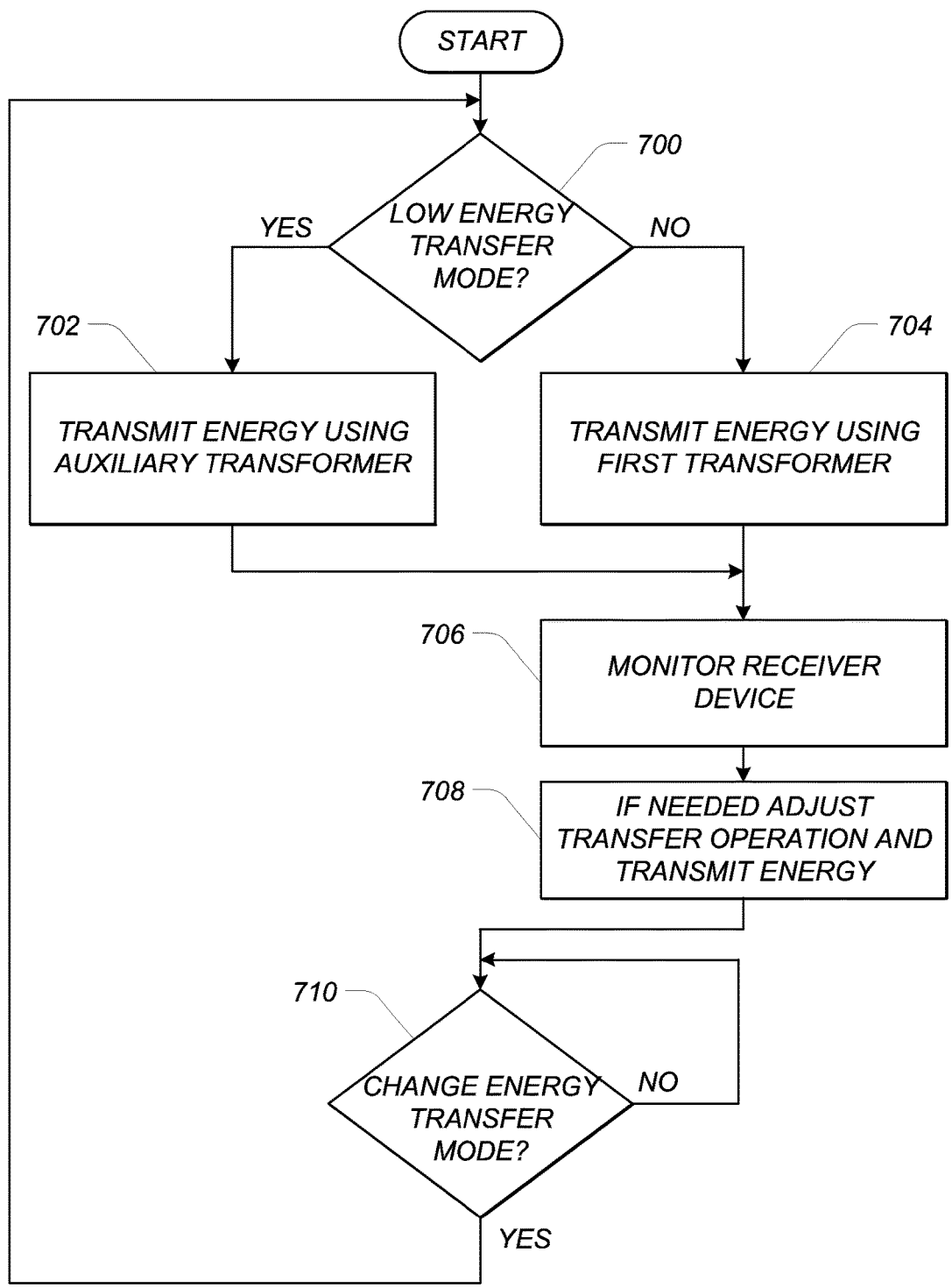
FIG. 7 is a flowchart of a method for operating an inductive energy transfer system.

Referring now to FIG. 7, there is shown a flowchart of a method for operating an inductive energy transfer system. Initially, a determination may be made as to whether the inductive energy transfer system is to operate in a low energy transfer mode (block 700). As described earlier, a low energy transfer mode can be used when the load is lighter (i.e., not drawing much current). In one embodiment, a lesser amount of energy is transfer to the load at a higher frequency.

If the inductive energy transfer system is to operate in the low energy transfer mode, the process passes to block 702 where the auxiliary transformer transfers energy from the transmitter device to the receiver device in the low energy transfer mode. If the inductive energy transfer system will not operate in the low energy transfer mode, the method continues at block 704 where the first transformer transfers energy from the transmitter device to the receiver device. In one embodiment, the first transformer transfers a higher amount of energy at a lower frequency compared to the auxiliary transformer. This mode may be called a power transfer mode.

The process passes to block 706 after block 702 or after block 704. In block 706, one or more operations in the receiver device is monitored. For example, in one embodiment, the current input into the load is monitored to determine whether or not the transfer of energy needs to be adjusted. The frequency of the energy transfer is adjusted at block 708 if the operations in the receiver indicate the frequency of the power transfer should be modified. The load and/or the efficiency of energy transfer can be monitored continuous, periodically, or at select times and adjustments made accordingly to improve efficiency. As described earlier, the efficiency curve may be optimized over a wider range of load currents or conditions in real time or near real time.

A determination may then be made at block 710 as to whether the mode of energy transfer should change. If not, the method waits and the efficiency of the energy transfer is monitored continuous, periodically, or at select times. If the mode of energy transfer is to change, the method returns to block 700.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. A receiver device operable in a power transfer mode and a low energy transfer mode in an inductive energy transfer system, the receiver device comprising:
   an AC-to-DC converter;
   a load operatively connected to an output of the AC-to-DC converter;
   a first receiver coil associated with the power transfer mode;
   a first resonant circuitry associated with a first resonant frequency and coupling the first receiver coil and an input of the AC-to-DC converter;
   an auxiliary receiver coil associated with the low energy transfer mode;
   an auxiliary resonant circuitry coupling the auxiliary receiver coil to the input of the AC-to-DC converter; wherein the auxiliary resonant circuitry is associated with a second resonant frequency that is different from the first resonant frequency; and
   a processing device configured to transition the receiver device to the low energy transfer mode from the power transfer mode upon determining that a current draw of the load has decreased below a threshold.

2. The receiver device as in claim 1, further comprising a switching device operatively connected between the first resonant circuitry and the input of the AC-to-DC converter and operatively connected between the auxiliary resonant circuitry and the input of the AC-to-DC converter.

3. The receiver device as in claim 2, wherein the processing device is operatively connected to the switching device for controlling a state of the switching device.

4. The receiver device as in claim 3, further comprising an auxiliary rectifier operatively connected to the switching device and the load.

5. The receiver device as in claim 1, wherein the load comprises a rechargeable battery.

6. The receiver device as in claim 1, wherein the first resonant circuitry and the auxiliary resonant circuitry each comprise a capacitor.

7. The receiver device as in claim 1, wherein the AC-to-DC converter comprises a diode bridge.

8. The receiver device as in claim 1, wherein the AC-to-DC converter comprises a synchronous rectifier.

9. The receiver device as in claim 1, wherein the second resonant frequency is higher than the first resonant frequency.

10. A transmitter device for use in an inductive energy transfer system, comprising:
    a DC-to-AC converter;
    a first resonant circuitry associated with a first resonant frequency and a power transfer mode, the first resonant circuitry operatively connected to the DC-to-AC converter;
    an auxiliary resonant circuitry associated with a second resonant frequency and a low energy transfer mode, wherein the second resonant frequency is different from the first resonant frequency;
    a primary transmitter coil operatively connected to the first resonant circuitry;
    an auxiliary transmitter coil operatively connected to the auxiliary resonant circuitry; and
    a processing device configured to transition the transmitter device to the low energy transfer mode from the power transfer mode upon determining that a current draw of a receiver device has decreased below a threshold.

11. The transmitter device as in claim 10, further comprising a power supply operatively connected to the DC-to-AC converter.

12. The transmitter device as in claim 10, wherein the second resonant frequency is higher than the first resonant frequency.

13. The transmitter device as in claim 10, wherein the first resonant circuitry and the auxiliary resonant circuitry each comprise a capacitor.

14. The transmitter device as in claim 10, further comprising:
    a sense circuitry operatively connected to a load; wherein the processing device is operatively connected to the sense circuitry.

15. A method for operating an inductive energy transfer system, comprising:
    transferring power from a transmitter device to charge a battery of a receiver device using a first transformer operated in a power transfer mode; and
    thereafter, transferring power from the transmitter device to trickle charge the battery of the receiver device using an auxiliary transformer operated in a low energy transfer mode after determining that the battery is charged beyond a threshold.

16. The method as in claim 15, further comprising:
    monitoring a load in the receiver device; and
    changing to a different transfer mode based on an operating condition of the load.

17. The method as in claim 15, wherein the transmitter device pings the receiver device with the auxiliary transformer.

18. The method as in claim 15, further comprising monitoring transfer efficiency during the power transfer mode and adjusting at least one of a frequency and a signal level to increase the transfer efficiency.

19. The method as in claim 15, wherein the power transfer mode is associated with a first resonant frequency and the low energy transfer mode is associated with a second resonant frequency that is higher than the first resonant frequency.

* * * * *